United States Patent

Monjean et al.

[11] Patent Number: 5,449,180
[45] Date of Patent: Sep. 12, 1995

[54] SAFETY DEVICE FOR PRIMARY PUMP

[75] Inventors: Daniel Monjean, Jeumont; Richard Mahaut, Maubeuge, both of France

[73] Assignee: Jeumont Schneider Industrie, Paris, France

[21] Appl. No.: 6,634

[22] Filed: Jan. 21, 1993

[30] Foreign Application Priority Data

Jan. 24, 1992 [FR] France ............... 92 00783

[51] Int. Cl.⁶ .............................................. F16J 15/40
[52] U.S. Cl. ............................... 277/28; 277/27; 277/81 R
[58] Field of Search ............ 277/27, 28, 59, 61, 277/72 R, 81 R, 83, 173, 65

[56]  References Cited
U.S. PATENT DOCUMENTS

| | | | |
|---|---|---|---|
| 2,834,619 | 5/1958 | McNab | 277/28 |
| 3,096,985 | 7/1963 | Biheller | 277/65 |
| 3,580,587 | 5/1971 | Hessheim | 277/28 X |
| 3,679,217 | 7/1972 | Lesiecki | 277/28 X |
| 3,926,442 | 12/1975 | Müller | 277/27 X |
| 4,722,663 | 2/1988 | Swearingen | 277/28 X |
| 4,848,774 | 7/1989 | Nyilas et al. | 277/28 X |
| 4,895,394 | 1/1990 | Delamare | 277/28 X |

FOREIGN PATENT DOCUMENTS

| | | |
|---|---|---|
| 0148583 | 7/1985 | European Pat. Off. . |
| 2474605 | 3/1983 | France . |
| 1809620 | 5/1970 | Germany ............... 277/28 |
| 1650056 | 8/1970 | Germany ............... 277/28 |
| 3540369 | 5/1986 | Germany . |
| 0603719 | 4/1960 | Italy ................... 277/27 |
| 0285078 | 11/1962 | Netherlands ........... 277/28 |

Primary Examiner—William A. Cuchlinski, Jr.
Assistant Examiner—John L. Beres
Attorney, Agent, or Firm—Rines & Rines; Shapiro & Shapiro

[57] ABSTRACT

The invention relates to a safety device that ensures longitudinal sealing of the shaft of a primary pump following the rupture of one of the seals separating the high-pressure chamber from the low-pressure chamber of the fluid in the pump, the device made up of a hollow piston comprising an upstream side part of outer diameter D1, and a downstream side part of outer diameter D3, greater than D1, the piston coaxially surrounding the shaft and being placed in a chamber made in the seal housing, the device also comprising activation means which axially move the piston against the shaft when a seal ruptures, wherein two annular chambers are made on the downstream side of the piston, the first, whose outer diameter D2 is greater than D1, communicating with the low-pressure chamber.

5 Claims, 2 Drawing Sheets

SAFETY DEVICE FOR PRIMARY PUMP

BACKGROUND OF THE INVENTION

1. Field of the Invention

This invention relates to a safety device for a nuclear reactor cooling pump.

2. Description of the Related Art

A conventional nuclear power station contains a nuclear reactor, three or four steam generators and three or four cooling circuits for cooling the nuclear reactor in which circulates a primary cooling fluid. In PWR (Pressurized Water Reactor) nuclear power stations, the primary cooling fluid is water, which is placed under a pressure of approximately 15.5 MPa. Each circuit comprises a "hot" branch through which the high-temperature cooling fluid flows from the nuclear reactor to the first expansion chamber of each steam generator. A thermal interchange then occurs between the cooling fluid and the water supplied to each steam generator.

Each circuit also contains a "cold" branch in which the cooling fluid, whose temperature has been lowered by the above-mentioned heat exchange, flows from the second expansion chamber of each steam generator to the nuclear reactor. Finally, the "cold" branch of each circuit is fitted with a primary motor-driven pump which circulates the cooling fluid.

Conventionally, the axis of the primary motor-driven pump units is vertical, with the motor arranged above the pump on a support. The cooling fluid is sucked in at the lower part of the pump, along the pump axis, and is then discharged either laterally, radially or tangentially.

As shown in FIG. 1, pump 1 generally comprises a housing 2 which is terminated at its upper part by a seal housing 4, pump shaft 3 being mounted so as to rotate in this housing 4.

When the motor turns drive shaft 3, the wheel inside pump housing 2 makes the cooling fluid circulate at pressures ranging from atmospheric pressure up to 15.5 MPa and at a temperature in the order of 280° to 300° C. This pressurized cooling fluid exerts an upwardly directed force on the pump shaft as far as the upper part of seal housing 4 is at atmospheric pressure.

Three seals 5, 6 and 7 are generally provided to allow pump shaft 3 to rotate freely in seal housing 4 and ensure sealing between the inside of pump housing 2 and the outside of the seal housing. These three seals 5, 6, 7 are arranged around the shaft, one above the other, inside housing 4.

This set of three successive seals therefore normally ensures the sealing of the shaft. However, if this set of seals either completely or partially fails, the downside (downstream side) elements are subjected to pressures in excess of their design pressures, and if they rupture, the contaminated pressurized fluid spills out and fills the chamber of the reactor building.

This is why a safety device is provided, such as the device referenced 8 in FIG. 1. This device is arranged inside the upper part of seal housing 4.

Such a safety device is commonly called a shut-down sealing device because it is activated after the primary pump has been stopped.

Commonly assigned French Patent No. 80 01 517 (publication No. 2,434,605) describes such a safety device for a primary pump.

This device comprises a hollow cylindrical piston which coaxially surrounds the shaft of the pump and which is located on the downside of third seal 7. This piston is normally located in a housing made for this purpose in the seal housing. In the event of a rupture, the pump is first stopped and then the means provided to move the piston activated, The piston then compresses a seal against the shaft which stops the fluid from flooding the reactor chamber.

A number of drawbacks of this safety device have nevertheless been noted.

First, it was noted that in the event of at least two seals rupturing, the pressure created on the upside upstream side) of the hollow piston became relatively high and then caused the piston to engage with the shaft before the pump had been slowed down and stopped and the means for axially moving this piston activated. As mentioned above, this safety device is only intended to function when the pump is at a stand-still so as to avoid any deterioration. It therefore became necessary in practice to arrange two rods perpendicularly to the shaft to maintain the piston in the lower position. These rods are only released when the means for axially moving the piston are activated.

It can be readily appreciated that the presence of these two rods makes for greater complexity in both the manufacture and operation of the safety device.

The preferred means for moving the piston are formed by an auxiliary pressurized fluid source, compressed air for example, it also being noted that this pressure had to be relatively high, possibly reaching as much as 5 MPa.

SUMMARY OF THE INVENTION

An object of the invention is to provide an improved safety device that satisfies the following conditions in all working cases:

the safety device is maintained in the inactive position whenever the pump is working, the safety device is closed when the pump stops and the safety device has a relatively low activation pressure.

The invention therefore relates to a safety device that ensures longitudinal sealing of the shaft of a primary pump following the rupture of at least 2 seals separating the high-pressure chamber from the low-pressure chamber of the fluid in the said pump, said device made up of a hollow piston comprising an upside part of outer diameter $D1$, and a downside part of outer diameter $D3$, greater in diameter than $D1$, said piston coaxially surrounding the shaft and being placed in a chamber made in the seal housing, said device also comprising activation means which axially move the piston against the shaft when one of the said seals ruptures, wherein two annular chambers are made on the downside of the piston, the first annular chamber, of outer diameter $D2$ and greater in diameter than $D1$, communicating with the low-pressure chamber.

In accordance with one embodiment of the invention, an annular cavity of diameter $D2$ is made in the downside part of the said piston, said seal housing comprising a projecting annular element intended to work with said cavity to delimit with the shaft the said first chamber.

In accordance with a variant of the invention, the said annular element is carried by the upside face of an annular piece added to said housing.

Preferably, the play provided between the seal housing or annular part and the shaft is relatively small, whereas that provided between the hollow piston and the shaft is relatively large.

In a preferred mode, the activation means are formed by an auxiliary pressurized fluid source connected to a pipe communicating with a chamber made around the downside part of said piston.

In accordance with a first embodiment of the invention, the said second chamber communicates with the exterior of the seal housing.

For this, passages are made in the seal housing or between the annular piece and the seal housing.

In a preferred embodiment of the invention, springs are provided between the annular piece and the piston. The presence of these springs ensures the automatic return of the piston to its lower position when the activation means are switched off.

In accordance with a first variant, the second chamber is filled with a gas at a specific pressure.

In accordance with a second variant, the second chamber is filled with a liquid.

In accordance with a third variant, the second chamber is linked to a pressure source of a specific value, notably to the said auxiliary pressurized fluid source.

BRIEF DESCRIPTION OF THE DRAWINGS

A better understanding of the invention will be gained, and additional objects, advantages and characteristics will appear more clearly, from the following detailed and non-limiting description of preferred embodiments of the invention taken in conjunction with the accompanying drawings in which.

DESCRIPTION OF THE PREFERRED EMBODIMENTS

Figure 2:
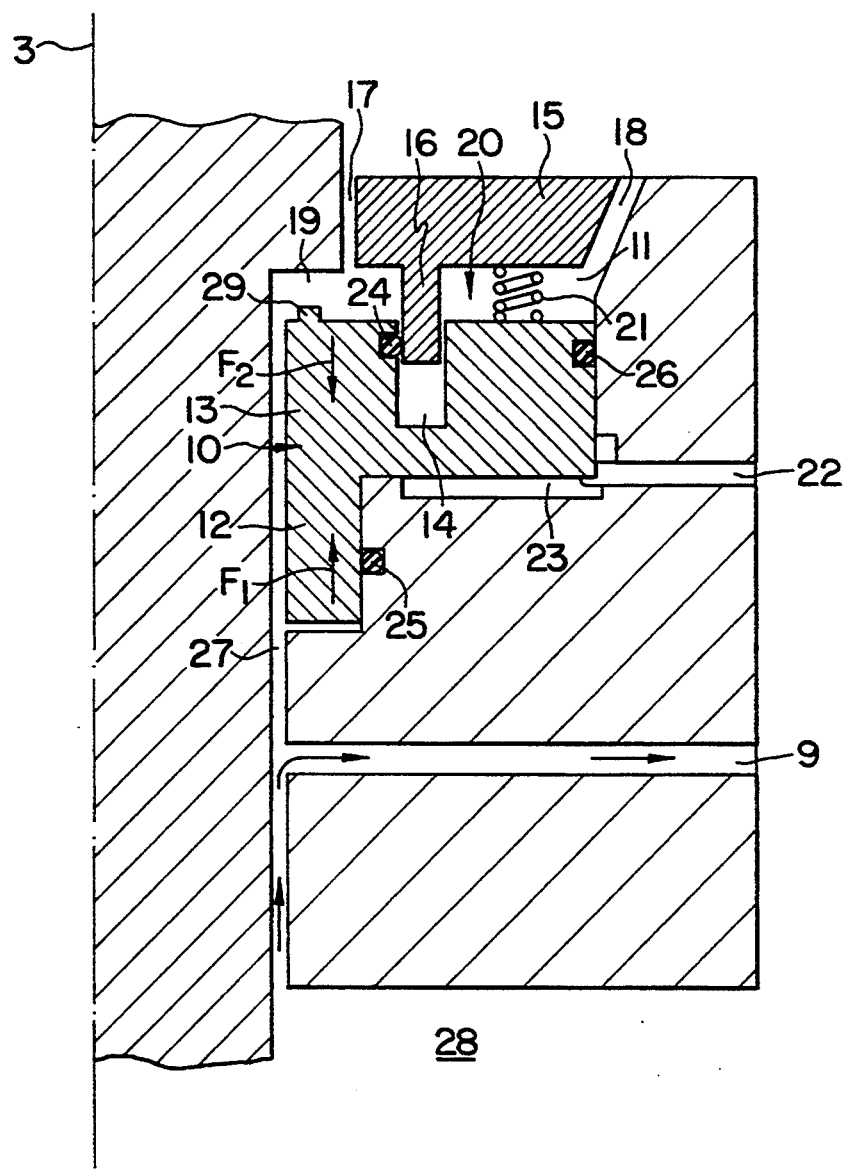
FIG. 2 is a diagrammatical drawing of an axial half-section of a device in accordance with the invention.

Referring to the drawings, FIG. 2 depicts a preferred embodiment of the present invention.

Figure 1:
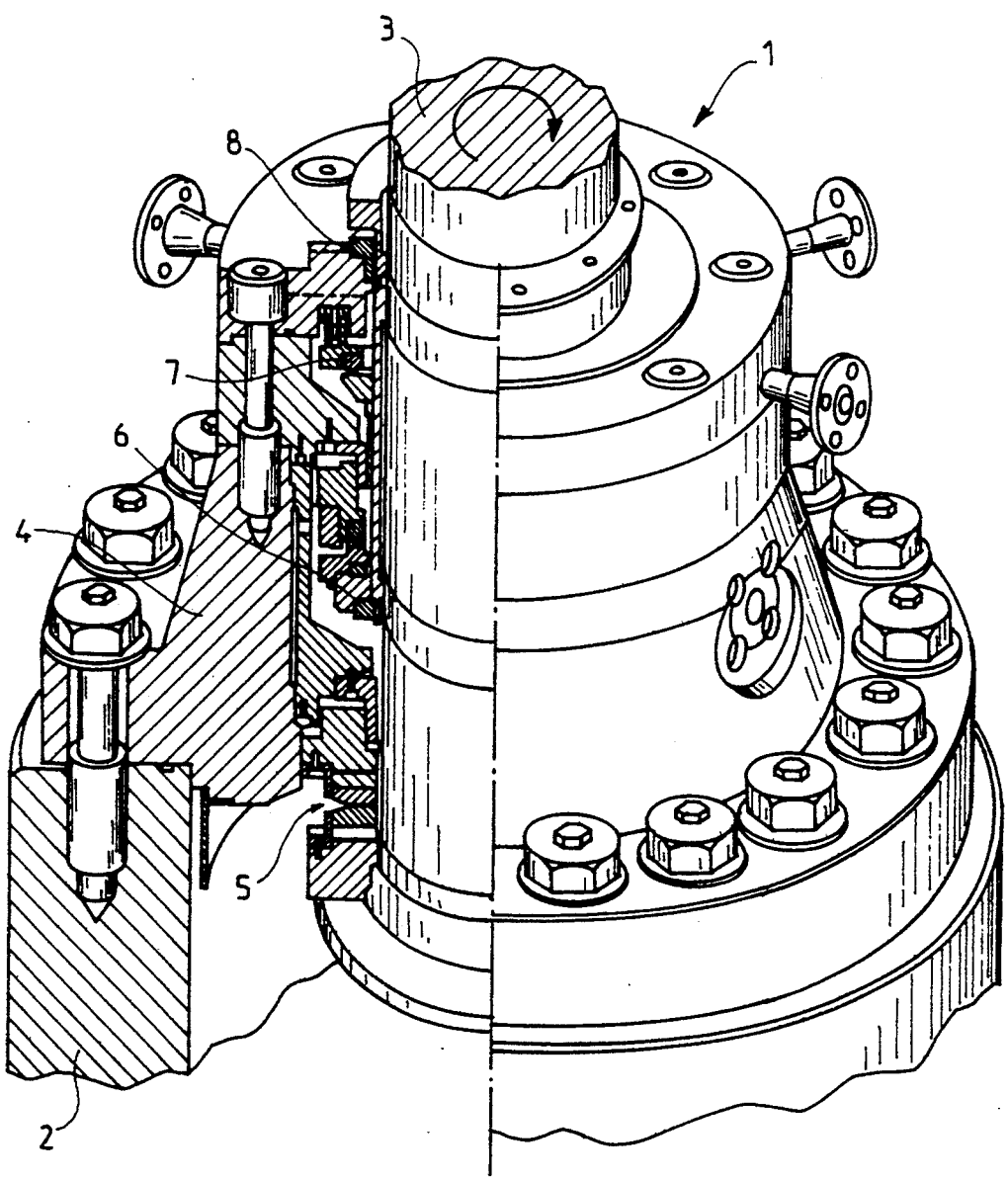
FIG. 1 illustrates a primary motor driven pump.

Those elements common with FIG. 1 will be designated by the same references.

Referring now to FIG. 2, in which the symmetry axis of the pump is represented by a dotted-dashed line, shaft 3 and seal housing 4 are shown again, with shaft 3 able to turn inside housing 4. The set of three seals, which is not shown in FIG. 2, separates the high-pressure chamber, not shown, from chamber 28 in which a pressure P1 prevails, this pressure P1 being lower than that in the high-pressure chamber. The leak fluid is channelled along shaft 3 and evacuated via pipe 9 communicating with the low-pressure chamber 28.

If seal 5, 6 or 7 fails, the system of shaft seals will let water pass at a high rate, possibly reaching several tens of cubic meters of water per hour depending on the nature of the damage that has occurred. Moreover, the pressures existing inside the system of shaft seals rise substantially, the pressure in chamber 28 possibly reaching 10 MPa.

As explained above, a safety device is provided to stop pressurized fluid escaping from the seal housing, the outside of which is at atmospheric pressure.

This safety device is essentially made up of a hollow or annular piston 10 of inner diameter D0. This piston is placed in a chamber 11 made in seal housing 4. It is made up of a lower or upside (upstream) part 12 of outer diameter D1 and an upper or downside (downstream) part 13 of outer diameter D3, greater in diameter than D1. An annular cavity 14 is made in the downside part 13 of the piston, the inner diameter D2 of this cavity being greater than diameter D1.

An annular piece 15 is also provided, and is placed at the upper or downside end of chamber 11 of piston 10. This piece 15 comprises a projecting annular element 16 on its lower or upside face. This element 16 is intended to work with cavity 14 made in hollow piston 10.

It should be noted that this annular piece could be an added piece that is fixed onto the seal housing. It might also be an integral part of this housing.

Play 17 provided between shaft 3 and annular piece 15 is relatively small, and projecting element 16 thus makes it possible to delimit with shaft 3 a first chamber 19 in which a pressure P2 prevails, pressure P2 being lower than pressure P1 in low-pressure chamber 28. It can be appreciated, in fact, that because of the presence of radial play 27 between the piston and the shaft, and of hollow piston 10, pressure P2 is lower than pressure P1 which exerts force over the lower or upside face off the lower or upside part 12 of the piston.

Radial play 27 is chosen to be relatively high so that the pressure loss at this level is low, irrespective of the flow rates obtained, and so that pressure P2 remains slightly lower than P1. Projecting element 16 also allows a second chamber 20 to be defined, determined by piston 10 and seal housing 4. Passages 18, made between the annular piece and the seal housing or in the seal housing, link chamber 20 with the outside of the seal housing and allow this chamber, like the outside of the seal housing, to be at atmospheric pressure.

It should be noted that springs 21 are arranged in second chamber 20 between annular piece 15 and hollow piston 10. It is understood that these springs could also be arranged in first chamber 19 or even in both chambers 19 and 20.

Finally, the safety device comprises activation means that can move the hollow piston 10 axially in such a way that it presses against the shaft in order to reduce and eliminate fluid escaping into the chamber of the reactor. The preferred means for moving the piston 10 are made up of an auxiliary pressurized fluid source, such as compressed air under a pressure of between 0.5 and 1 MPa, this auxiliary source being connected to pipe 22 which communicates with an annular chamber 23 made around the upper or downside part of hollow piston 10.

Seals 24, 25 and 26, which are, for example, O-rings, stop the different pressurized fluids from mixing together.

Outside any working anomaly of one or more of seals 5 to 7, any eventual leakage flow from seal 7 will escape via pipe 9. Pressure P1 prevailing in low-pressure chamber 28 is therefore atmospheric pressure.

There is no flow via annular space 27 and the pressure P2 in first chamber 19 is virtually atmospheric pressure. Since diameter D2 is greater than diameter D1, the piston is subjected to a downwardly directed force and as a result remains at the lower position.

When a seal failure occurs, pressure P1 prevailing in low-pressure chamber 28 increases, and the primary fluid spills out via radial play 27. Primary fluid then spills out outside the pump housing. The procedure for switching off the power to the electric motor driving the primary pump is then initiated.

Since radial play 27 was chosen to be relatively large, and play 17 between the annular piece and the shaft relatively small, pressure P2 prevailing in chamber 19 is very slightly lower than P1. Consequently, the sum of the forces exerted on the hollow piston acts in a downwardly direction, therefore keeping the hollow piston at its lower position.

Once the pump has stopped, the safety device is activated by connecting the auxiliary pressurized fluid source to pipe 22. This pressurized fluid penetrates into chamber 23 and exerts an upwardly directed force on the hollow piston causing piston 10 to move axially and strike against shaft 3. The sealing between hollow piston 10 and the shaft can be ensured by different means, notably by a metal-metal contact, in which case a projecting nose 29 is machined on piston 10, or by an O-ring at the upper part of the piston. The O-ring is not shown in FIG. 2. The projecting element 16 thus penetrates completely into cavity 14 and compresses springs 21. Hollow piston 10 thus allows to forbid the leakage of pressurized fluid to the outside of seal housing 4.

When, after depressurizing the high-pressure chamber, it is desired to return piston 19 to the lower position, the auxiliary pressurized fluid source is disconnected, the piston then returning automatically to the lower position under the effect of springs 21. The piston could, however, be returned to the lower position by a conventional manual device, in which case the springs may not necessarily be provided.

It is understood that when these springs 21 are provided, they must be chosen so that the activation means are capable of raising the pistol when they are implemented.

Thus, the safety device is designed in such a way that two annular chambers are made downside of piston 10. Pressure P2 prevailing in first chamber 19 is slightly lower than pressure P1 in low-pressure chamber 28, while higher or equal to atmospheric pressure prevailing in second chamber 20. Choosing an appropriate outer diameter D2 of the first chamber ensures that the sum of the forces acting on piston 10 is always downwardly directed whatever the working conditions. Thus the hollow piston remains in the lower position whenever the activation means are not implemented. It is not therefore necessary to provide additional locking means in the safety device.

In the embodiment of the safety device that has been described, first chamber 19 is created by the presence of annular piece 15 with its projecting element 16. The inner diameter of the corresponding annular cavity 14 must therefore be chosen in an appropriate manner.

It can be appreciated that because pressure P2 is not exerted over the whole of the upper or downside face of piston 10, the corresponding force F2 is limited, so that the value of the activation pressure remains within reasonable bounds. It is therefore possible to close the piston with activation pressures between 3 and 7 bars.

The surface over which pressure P2 is exerted must be limited as far as when seal deterioration occurs, pressure P2 can reach high values, possibly 9 MPa.

In the described embodiment, the value of the inner diameter of cavity 14 must therefore be carefully chosen so that the piston remains in the lower position whenever the activation means are not implemented, and the downwardly directed force exerted on the piston due to the pressure prevailing in chamber 19 must at the same time be limited to ensure that the activation means can move the piston to the upper position using a relatively low activation pressure.

When springs 21 are provided, the holding of the piston in its lower position as long as the activation means are not implemented is made even more secure.

Alternative embodiments can also be envisaged to take the place of springs 21.

For example, second chamber 20 can be filled with a gas at a specific pressure, for example 105 Pa, the second chamber in this case being sealed and no passages such as those referenced 18 being provided.

Chamber 20 can also be filled with a liquid, chamber 20 being brought into communication with the exterior of the seal housing when the safety device is activated.

Finally, second chamber 20 can be connected to a pressure source, notably the auxiliary pressurized fluid source of the activation means. When the safety device is activated, the pressurized source of the second chamber should be disconnected.

The reference signs inserted after the technical characteristics mentioned in the claims serve only to facilitate comprehension of said claims, and in no way limit the scope of the particular embodiment of the invention described above.

What is claimed is that:

1. A safety device that ensures longitudinal sealing of a shaft of a primary pump having a seal housing following a rupture of at least two seals separating a high-pressure chamber from a low-pressure chamber of said pump said safety device comprising:

a hollow piston coaxially surrounding said shaft and disposed in a chamber of said seal housing, said piston having an upstream part with a first outer diameter, and a downstream part with a second outer diameter that is greater than said first outer diameter, said downstream part having an annular cavity with an inner diameter greater than said first outer diameter;

an annular piece disposed in said seal housing and having a projecting annular element on an upstream face thereof received in said annular cavity, said annular piece and said shaft having a relatively small radial play therebetween and said piston and said shaft having a relatively large radial play therebetween;

a first annular chamber and a second annular chamber disposed to either side of said projecting annular element, said first annular chamber having a diameter equal to said inner diameter of said annular cavity and being delimited by said projecting annular element and said shaft, said first annular chamber communicating with said low-pressure chamber, and said second annular chamber communicating with an exterior of said seal housing; and activation means which axially moves said piston in a downstream direction into contact with said shaft when said seals rupture, said activation means having an auxiliary pressurized fluid source connected to a pipe communicating with an additional chamber adjacent to said downstream part of said piston.

2. Safety device as claimed in claim 1, wherein passages are provided between said annular piece and said seal housing.

3. Safety device as claimed in claim 1, wherein springs are provided between the annular piece and said piston.

4. Safety device as claimed in claim 1, wherein said second annular chamber is filled with a liquid.

5. Safety device as claimed in claim 1, wherein said second annular chamber is connected to said auxiliary pressurized fluid source.

* * * * *